United States Patent [19]

Tullier et al.

[11] 4,051,042
[45] Sept. 27, 1977

[54] FLUID FLOW FILTERING ARRANGEMENT

[76] Inventors: Leo D. Tullier, 4727 Bayou Vista, Houston, Tex. 77018; John F. Vignone, 8282 61 Drive, Flushing, N.Y. 11379

[21] Appl. No.: 641,099

[22] Filed: Dec. 15, 1975

[51] Int. Cl.² .............................................. B01D 21/02
[52] U.S. Cl. .................................... 210/409; 210/447
[58] Field of Search ..................... 210/409, 435–448, 210/497, 499

[56] References Cited

U.S. PATENT DOCUMENTS

| | | | |
|---|---|---|---|
| 908,308 | 12/1908 | Mueller | 210/443 |
| 1,152,831 | 9/1915 | Monteagle | 210/443 |
| 1,961,498 | 6/1934 | Kreuger | 210/447 |
| 2,530,283 | 11/1950 | Brown | 210/441 |
| 3,268,990 | 8/1966 | Adler | 210/449 |
| 3,481,474 | 12/1969 | Paulson | 210/304 |
| 3,530,993 | 9/1970 | Fulton | 210/411 |
| 3,552,552 | 1/1971 | Johnston | 210/497 |

*Primary Examiner*—Bernard Nozick
*Attorney, Agent, or Firm*—Jack W. Hayden

[57] ABSTRACT

An arrangement for filtering fluid flow includes a T connection having a hollow body connected with two aligned hollow lateral extensions. A plate is secured within and intersects the lateral extensions and has an opening therein to accommodate flow through the lateral projections. A filter member including a hollow core is positioned adjacent the plate and surrounds the opening in the plate for filtering flow through the lateral extensions. The filter member extends from the extensions into the body and is closed off at one end by a flange secured to the body.

18 Claims, 5 Drawing Figures

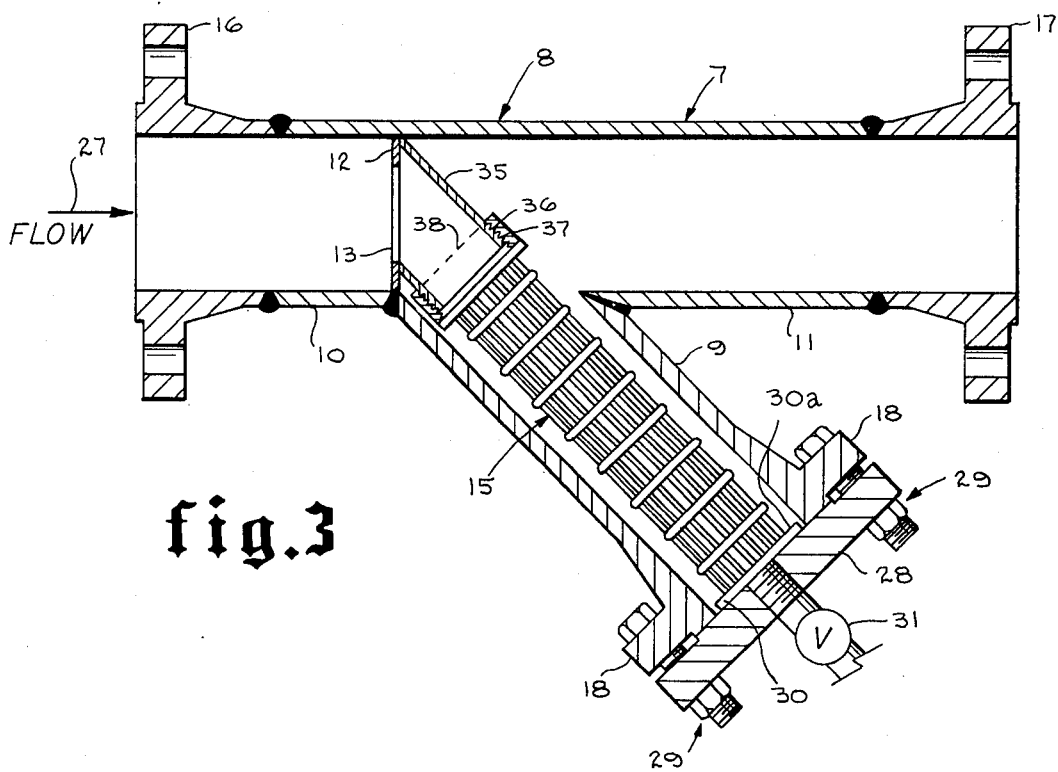
fig.3
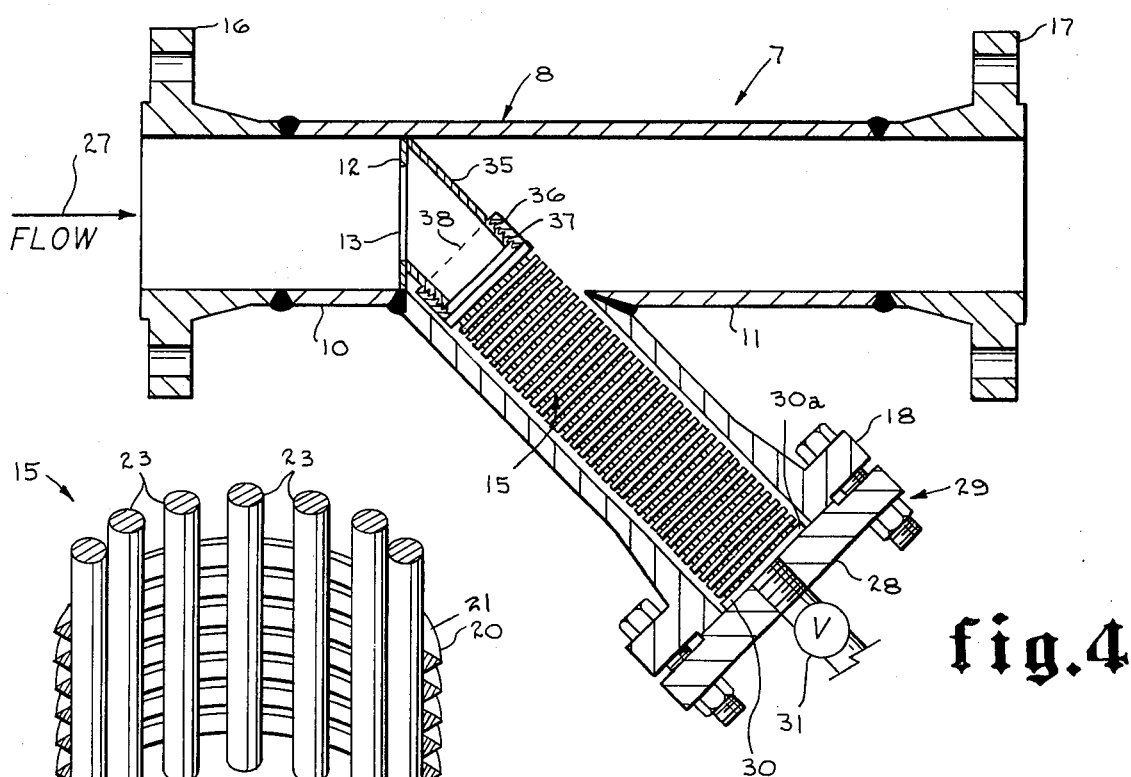
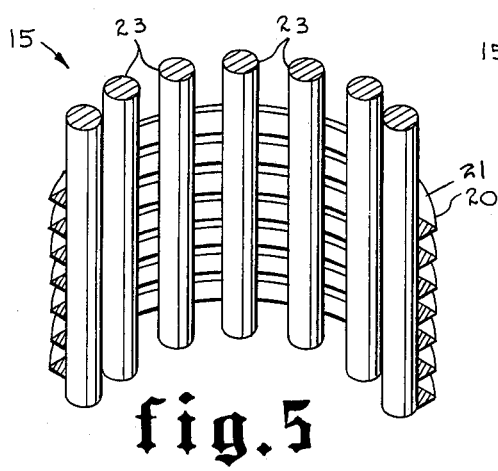
fig.5
fig.4

FLUID FLOW FILTERING ARRANGEMENT

SUMMARY OF THE INVENTION

The present invention is provided for filtering fluid flow in a manner so as to inhibit turbulence in the fluid flow and to thereby provide a more laminar flow. Also, the present invention may be quickly and readily positioned in any flow line for filtering flow therein, and is constructed and arranged so that the filter member may be removed for cleaning or replacement when necessary.

BRIEF DESCRIPTION OF THE DRAWINGS

FIG. 3 is a sectional view showing another form of the invention;

FIG. 4 is a sectional view showing another form of the invention; and

FIG. 5 is an enlarged partial perspective view showing the details of the filter core used in the FIGS. 2 and 4 form of the invention.

DESCRIPTION OF THE PREFERRED EMBODIMENTS

Figure 1:
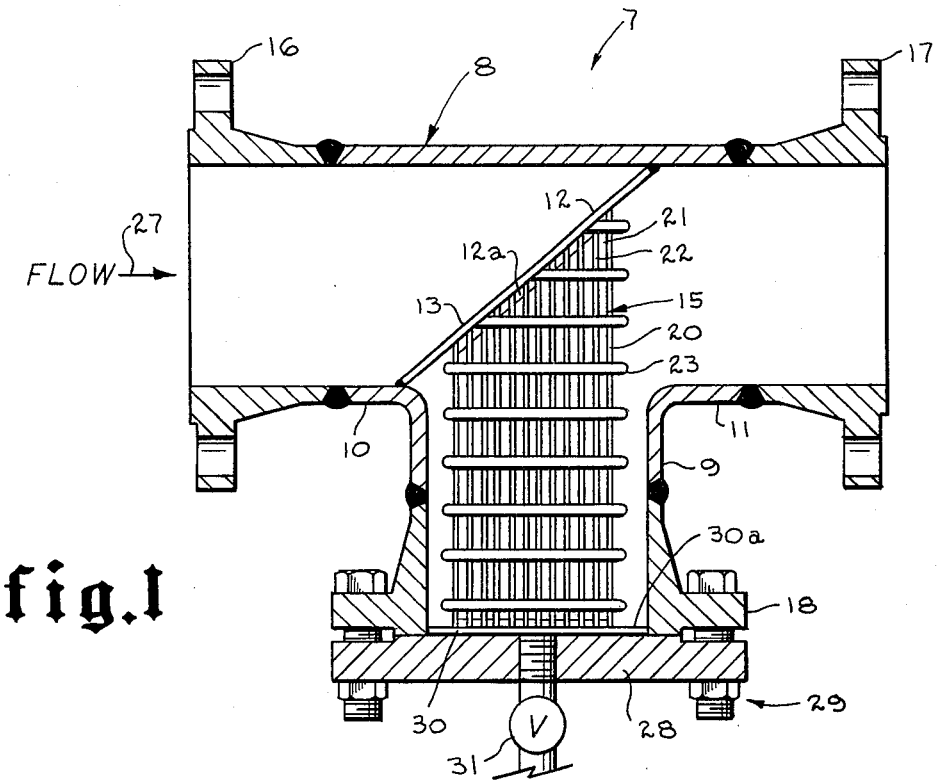
FIG. 1 is a sectional view showing one arrangement of the invention.

In FIG. 1 the arrangement of the present invention is referred to by the numeral 7 and includes the T connection having a hollow body referred to generally at 8. The body 8 of the T connection includes a hollow projection 9 which is integrally formed with and intersects the laterally extending and hollow extensions 10 and 11 for forming a fluid passage arrangement and means for positioning a filter member or wedge type filter core in the T connection. A plate 12 is positioned in an inclined relationship in the lateral extensions and intersects them as shown in the drawings. The plate 12 is sealably secured in position by any suitable means such as welds or the like. An opening 13 is provided in the plate 12 for communicating fluid flow to the filter member or hollow core 15 and through the hollow extensions.

Annular flanges 16, 17 and 18 are arranged on each of the lateral extensions 10, 11 and the body 9 respectively as shown in the drawings whereby such arrangement may be secured in a fluid flow line and for positioning the filter member in the arrangement as will be described.

The filter member 15 as shown in FIGS. 1 and 3 includes a hollow annular core 20 formed of a plurality of longitudinally extending, circumferentially spaced trapezpoidal or triangular shaped strips 21. When the strips are trapezoidal shaped they each have spaced parallel surfaces with one surface being wider than the other surface, and the two surfaces are joined by converging side surfaces. The strips are positioned in forming the core so that the surface having the greater extent or width faces in the direction from which the flow of fluid is received whereby the space 22 between the strips is smallest on the upstream side of the flow and is largest on the downstream side of the flow.

Thus, in the form of the invention illustrated in FIG. 1, the trapezoidal strips 21 are arranged so that the surface on each strip 21 which is of greater extent is on the inner periphery of the core and the smaller width surface on each strip which is parallel to such inner surface is on the outer circumference of the core 20.

The space 22 on the outer circumference of the core 20 between the strips 21 in this form will be larger than it is on the inside of the core 20 which receives the flow of fluid from the direction represented by the arrow 27. A plurality of reinforcing ribs 23 are mounted on the core 15 in longitudinal spaced relation and secured thereto as shown in the drawings.

Figure 2:
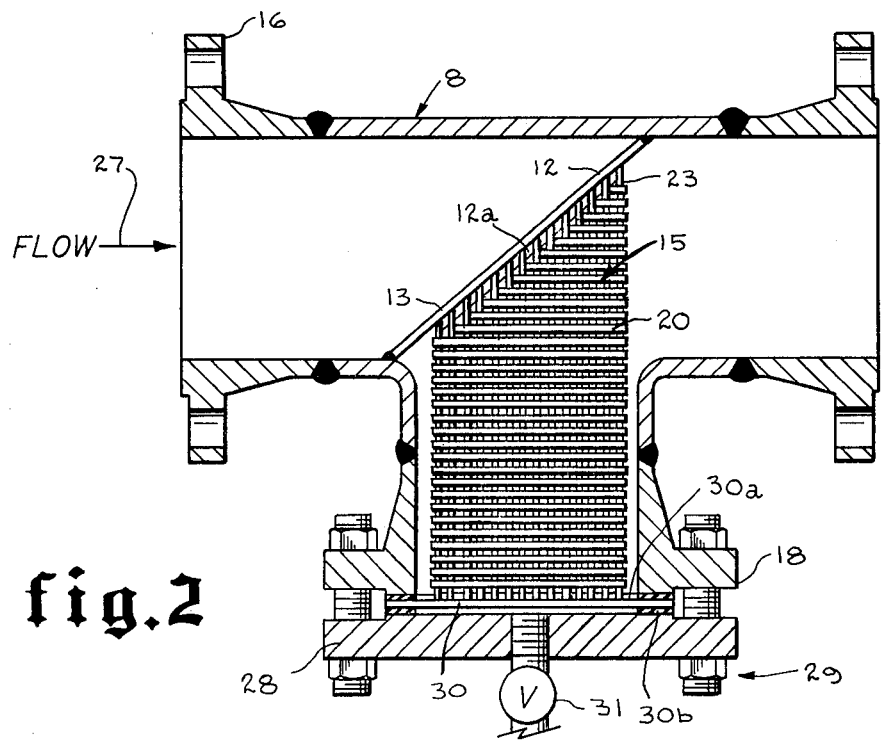
FIG. 2 is a sectional view showing another form of the invention.

An annular flange 12a is provided on the plate 12 surrounding the opening 13 and is telescopically received within the core 20 of the filter member 15 when the filter member is abutted against the plate 12 as shown in FIGS. 1 and 2 of the drawings. The flange 28 is secured to the flange 18 by means of the nut and bolt arrangement referred to at 29. The filter member 15 includes an annular shoulder or flange 30a on the end 30 of the filter member which abuts the flange 28 in the form of the invention shown in FIGS. 1, 3 and 4.

A valve 31 is mounted in a conduit secured in the flange 28 for blow down of the filter member when desired.

In the form of the invention illustrated in FIG. 2, the direction of the flow is again represented at 27. The filter member 15 is again provided with the trapezoidal or triangular shaped strips 21 which extend circumferentially of the core 20 as more clearly shown in FIG. 5. The strips 21 are arranged so that the surface of greater extent faces toward the direction from which fluid flow comes. This assures that the space 22 between the circumferentially extending strips 21 is always smallest facing in the direction from which the flow is coming to inhibit clogging of the filter and to aid in assuring entrapment of undesired contaminants in the fluid flow. The core 20 when in this form is provided with longitudinally extending reinforcing ribs 23 which are circumferentially spaced and engage the largest flat surface of the spaced rings 21 as shown in FIG. 5.

To remove the filter member, it is only necessary to remove the flange 28 for access to the filter member for removal or repair or replacement thereof.

In FIGS. 3 and 4 an arrangement similar to FIGS. 1 and 2 respectively is illustrated insofar as the filter member and construction of core 20 is concerned; however, it will be noted that the hollow projection 9 extends at an inclined angle relative to the longitudinal axis of the lateral extensions 10 and 11. The plate 12 extends substantially vertically relative to the longitudinal axis of the extensions 10 and 11 rather than in an inclined relation as shown in FIGS. 1 and 2 and a conduit 35 is secured thereto which communicates with the opening 13 in plate 12. The conduit 35 is provided with suitable means such as threads 36 which engage with the threads 37 formed on the extension 38 of the core 20 for removably securing the filter member 20 with the conduit 35. In other respects, like numerals refer to like components.

In FIG. 2, the filter member 15 is shown as having an annular flange 30a of substantially greater diameter than the filter member 15 so that it extends radially between flanges 18 and 28. A sealing gasket 30b is positioned on each side of the annular flange 30a and between the annular flange 24a and the adjacent external flange to inhibit leakage. The flanges 18 and 28 are then secured together by the nut and bolt arrangement.

The foregoing disclosure and description of the invention are illustrative and explanatory thereof, and various changes in the size, shape, and materials as well as in the details of the illustrated construction may be made without departing from the spirit of the invention.

What is claimed is:

1. An arrangement for filtering fluid flow in a conduit comprising:
   a. a T connection having a hollow body including a hollow projection which is connected with and intersects a pair of aligned hollow lateral extensions for forming a flow passage through the connection;
   b. flange means formed on said hollow projection;
   c. a plate secured in said T connection to intersect the flow passage, said plate having an opening therein;
   d. a hollow, annular filter member positioned in said hollow projection and extending into the flow passage, said filter member including:
      1. a core formed of spaced strips;
      2. said strips having a surface for receiving the flow of fluid;
      3. said strips having converging side surfaces extending from said fluid receiving surface whereby the space between said spaced strips is smallest adjacent the fluid receiving surface; and
      4. a plurality of spaced reinforcing ribs engaging said spaced strips;
   e. said filter member having an end positioned to communicate with the opening in said plate for receiving fluid flow in said filter member;
   f. closing means for closing the other end of said filter member; and
   g. retaining means secured to said flange means to retain said filter member in position in said hollow projection.

2. The invention of claim 1 wherein said reinforcing ribs are mounted on the outer periphery of said core.

3. The invention of claim 1 wherein said reinforcing ribs are mounted on the inner periphery of said core.

4. The invention of claim 1 wherein said hollow projection of said body extends from said lateral extensions in an inclined relationship relative to the longitudinal axis of said aligned extensions.

5. The invention of claim 4, wherein said plate includes a conduit secured thereto communicating with the opening in said plate and the filter member.

6. The invention of claim 5 including means on said filter member for securing said filter member to said conduit on said plate.

7. The invention of claim 1 wherein said strips extend longitudinally of said core and said reinforcing ribs extend circumferentially of said core in longitudinally spaced relationship.

8. The invention of claim 1 wherein said strips extend circumferentially of said core and said reinforcing ribs extend longitudinally of said core in circumferentially spaced relationship.

9. The invention of claim 1 wherein said retaining means includes:
   a. additional flange means secured to said flange means on said hollow projection;
   b. flange means on said plate engaging said filter member; and
   c. shoulder means on said filter member adjacent said additional flange means.

10. The invention of claim 9 wherein said shoulder means extends from said filter member for engagement with said hollow projection.

11. The invention of claim 9 wherein said shoulder means extends from said filter member and is engaged between said additional flange and said flange means on said hollow projection.

12. The invention of claim 9 wherein said flange means on said plate and said shoulder means on said filter member are constructed and arranged to center said filter member in said hollow projection.

13. The invention of claim 1 wherein said closing means includes additional flange means secured to said flange means on said hollow projection.

14. The invention of claim 13 wherein said additional flange means includes communicating means communicating with said filter member for blow down thereof when desired.

15. The invention of claim 1 wherein said closing means includes:
   a. additional flange means secured to said flange means on said hollow projection; and
   b. shoulder means on said filter member and secured between said flange and additional flange means.

16. The invention of claim 15 wherein said additional flange means includes communicating means communicating with said filter member for blow down thereof when desired.

17. The invention of claim 1 including communicating means communicating with said filter member for blow down thereof when desired.

18. The invention of claim 17 wherein said communicating means includes an opening in said closing and retaining means.